UNITED STATES PATENT OFFICE.

LEONHARD PINK, OF BERLIN, GERMANY, ASSIGNOR, BY MESNE ASSIGNMENTS, TO DUTCH HOLDING COMPANY, A CORPORATION OF NEW YORK.

TREATMENT OF CORKS.

1,056,447.  Specification of Letters Patent.  Patented Mar. 18, 1913.

No Drawing.  Application filed October 9, 1911.  Serial No. 653,545.

*To all whom it may concern:*

Be it known that I, LEONHARD PINK, chemist, resident of 4 Gleditsch street, in the city of Berlin, Empire of Germany, have invented certain new and useful Improvements in the Treatment of Corks; and I do hereby declare that the following is a full, clear, and exact description of the same.

The invention relates to the treatment of corks, and the object of the invention is to cover corks in such a manner that they will resist the introduction of foreign matter, without introducing any poisonous combinations that will taint the liquid in the bottle, and also so thoroughly treat them as to prevent the coating being removed by immersion in water, and it consists essentially in the treatment as more particularly set forth hereinafter and pointed out in the claim.

According to the former patent, granted to me in Germany, under Number 227918, corks are coated with a solution of cellulose in cuprammonium oxid and after being dried they are then treated with sulfuric acid in order to extract the oxid of copper and to make the cellulose like parchment. The present invention aims to simplify this process. In place of the solution of cellulose in ammonia of oxid of copper, use is made of celluloid dissolved in amylacetate or a solution of collodion into which the corks are dipped. After the evaporation of the amylcetate or of the ether-alcohol, the corks are put into a sulfuric acid bath, in the manner known, where the coating is rendered parchmentlike.

This process has the advantage that the coating does not contain any poisonous combinations of copper and does not show any pores which are formed by the extraction of the combinations of copper.

The following example will illustrate the process: The corks are being dipped into a two per cent. solution of nitro-cellulose with or without the addition of camphor in amylacetate; after having been sufficiently saturated they are taken out and dried and then put into a bath of sulfuric acid of about 60 degrees Baumé at an ordinary temperature. After that the corks are rinsed and dried. The action of the acid results in the parchmentizing of the coating applied to the cork which parchmentizing is carried on due to the action of the acid. The corks, thus treated, show a dull, parchmentlike coating of such elasticity that when the corks expand on account of their being soaked in boiling water, the coating will not be torn. Furthermore, this skin will not be destroyed by friction or pressure in the neck of the bottle. In contrast therewith, the corks coated with a solution of nitro-cellulose and without an after-treatment of sulfuric acid, cannot be softened any more in hot water, but are and remain hard and useless, the coating gradually peeling off and becoming cracked.

What I claim as my invention is:

The treatment of corks herein described, consisting in coating the corks by dipping them in celluloid dissolved in a solution of amylacetate or its equivalent and in subjecting the corks to sulfuric acid of such concentration and for such time as to parchmentize the coating.

Signed at Montreal, Quebec, Canada this 30th. day of September, 1911.

LEONHARD PINK.

Witnesses:
G. H. TRÉSIDDER,
H. R. TAYLOR.